US012632717B2

(12) United States Patent (10) Patent No.: US 12,632,717 B2
Terasaki (45) Date of Patent: May 19, 2026

(54) NEUROMORPHIC DEVICE AND METHOD OF CONTROLLING NEUROMORPHIC DEVICE

(71) Applicant: TDK CORPORATION, Tokyo (JP)

(72) Inventor: Yukio Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 583 days.

(21) Appl. No.: 18/133,186

(22) Filed: Apr. 11, 2023

(65) Prior Publication Data

US 2024/0346301 A1 Oct. 17, 2024

(51) Int. Cl.
*G06N 3/065* (2023.01)
*G06N 3/049* (2023.01)
(52) U.S. Cl.
CPC ............. *G06N 3/065* (2023.01); *G06N 3/049* (2013.01)
(58) Field of Classification Search
CPC ........ G06N 3/065; G06N 3/049; G06N 3/084; G06N 3/088; H10N 79/00; H10N 70/011; H10N 70/20
See application file for complete search history.

(56) References Cited

U.S. PATENT DOCUMENTS

| | | | | |
|---|---|---|---|---|
| 8,750,062 | B2 * | 6/2014 | Seroussi | G11C 13/004 |
| | | | | 365/201 |
| 9,336,870 | B1 * | 5/2016 | Mickel | G11C 13/0069 |
| 9,412,446 | B1 * | 8/2016 | Lohn | G11C 11/5614 |

| | | | | |
|---|---|---|---|---|
| 9,679,242 | B2 * | 6/2017 | Nugent | G06N 3/082 |
| 10,970,441 | B1 * | 4/2021 | Zhang | G06N 3/082 |
| 2014/0344202 | A1 * | 11/2014 | Thibeault | G06N 3/08 |
| | | | | 706/25 |
| 2018/0350432 | A1 | 12/2018 | Sasaki | |
| 2020/0272891 | A1 | 8/2020 | Terasaki | |
| 2021/0342679 | A1 * | 11/2021 | Karpov | H10N 70/8836 |
| 2022/0044719 | A1 * | 2/2022 | Li | G06N 3/084 |
| 2022/0351045 | A1 * | 11/2022 | Nugent | G06N 3/088 |
| 2022/0374688 | A1 * | 11/2022 | Wu | G06N 3/09 |

(Continued)

FOREIGN PATENT DOCUMENTS

| | | |
|---|---|---|
| JP | 6885399 B2 | 6/2021 |
| WO | 2019/043990 A1 | 3/2019 |

OTHER PUBLICATIONS

Mohammad Mehdi Sharifi et al. "Application-Driven Design Exploration for Dense Ferroelectric Embedded Non-Volatile Memories". 2021 IEEE/ACM International Symposium on Low Power Electronic and Design (ISLPED), Jul. 26-28, 2021.

(Continued)

*Primary Examiner* — Angelica Ruiz

(74) *Attorney, Agent, or Firm* — Oliff PLC

(57) ABSTRACT

A neuromorphic device includes a control unit. The control unit is configured to be connectable to a memristor having electrical characteristics in which conductance change occurs stochastically when a writing signal is applied to the memristor and is configured to apply the writing signal to the memristor. The writing signal is determined based on a necessary value of the conductance change amount of the memristor which is calculated from an update value of a weight of a neural network and an expected value by which the conductance of the memristor changes when a reference writing signal is applied to the memristor.

10 Claims, 10 Drawing Sheets

(56)                References Cited

U.S. PATENT DOCUMENTS

| | | | |
|---|---|---|---|
| 2023/0041035 A1* | 2/2023 | Harsha | G06N 3/006 |
| 2023/0229900 A1* | 7/2023 | Terasaki | G06N 3/08 |
| | | | 706/15 |

OTHER PUBLICATIONS

Tayfun Gokmen et al. "Algorithm for Training Neural Networks on Resistive Device Arrays". Frontiers in Neuroscience, 2020, vol. 14, article 103.

* cited by examiner

FIG. 1

NEUROMORPHIC DEVICE AND METHOD OF CONTROLLING NEUROMORPHIC DEVICE

BACKGROUND

Field

The present invention relates to a neuromorphic device and a method of controlling a neuromorphic device.

Description of Related Art

A neural network is a mathematical model which mathematically models a structure of the neural circuitry of a human brain. A neuromorphic device is a device of the neural network. The neuromorphic device artificially mimics a relationship between neurons and synapses in a human brain.

There are many types of neuromorphic devices according to how brain functions are mimicked. An example thereof is a resistance-change element called a memristor. Studies for performing AI computing such as deep learning in an analog manner using a memristor have progressed. By connecting resistance-change elements in an array shape, nodes (neurons in a brain) arranged in a hierarchical shape and transmission means (synapses in the brain) connecting the nodes are formed. The neuromorphic device increases a rate of correct answers to a question by causing the transmission means (synapses) to learn. Learning is to find out knowledge which will be able to be used in the future from information, and input data in the neuromorphic device is weighted.

For example, Non-Patent Document 1 (Mohammad Mehdi Sharifi et al., 2021 IEEE/ACM International Symposium on Low Power Electronic and Design (ISLPED) 26-28 Jul. 2021) discloses a neuromorphic device using a ferroelectric transistor (FeFET).

For example, Non-Patent Document 2 (Tayfun Gokmen and Wilfried Haensch. Frontiers in Neuroscience., Volume 14 Article 103) discloses a learning method of a device for performing neuromorphic computing using a resistance-change element such as a phase-change memory (PCM).

For example, Patent Document 1 (Japanese Patent No. 6885399) discloses a neuromorphic device in which a magnetic domain wall movement type resistance-change element (hereinafter referred to as a magnetic domain wall moving element) using spintronics technology is used as a memristor. The magnetic domain wall moving element includes a magnetic domain wall moving layer, a tunnel insulating layer, and a magnetization fixed layer. The magnetic domain wall moving layer includes two magnetic domains with different spin directions and a magnetic domain wall disposed at a boundary therebetween. The tunnel insulating layer is interposed between the magnetic domain wall moving layer and the magnetization fixed layer. The magnetic domain wall can be moved by applying a writing signal (a current) to the magnetic domain wall moving layer. A resistance value in a stacking direction of the magnetic domain wall moving element changes according to the position of the magnetic domain wall. The magnetic domain wall moving element changes in conductance at the position of the magnetic domain wall and is an example of a memristor.

SUMMARY

A memristor is a passive element of which resistance changes. Since conductance G is represented by a reciprocal of resistance R, the memristor can also be said to be a passive element of which conductance changes. The conductance of a memristor changes by applying a writing signal to the memristor. The writing signal is applied, for example, by applying an electric field to the memristor or causing a current to flow in the memristor. The memristor has characteristics in which conductance changes and thus can be applied to a neuromorphic device. For example, a magnetic domain wall moving element exhibits conductance change with good linear symmetry when a writing signal is applied thereto in principle, and can be appropriately applied to a neuromorphic device.

On the other hand, even when a writing signal is applied to a memristor, conductance thereof may not change as desired due to the operation principle, manufacturing precision limitation, and the like of the memristor. For example, in a magnetic domain wall moving element, a phenomenon in which a magnetic domain wall does not move and stays at a current position even when a predetermined writing signal (current) is applied thereto is observed stochastically. This phenomenon is called a trapping phenomenon. This is because the magnetic domain wall of the magnetic domain wall moving element may be trapped by potential change due to a groove or the like formed at the time of manufacturing. In this case, the conductance of the magnetic domain wall moving element does not cause desired conductance change even when a writing signal is applied thereto. This is a stochastic phenomenon which may occur intrinsically due to trade-off of limitations of an element forming process and an applied current (voltage) or the like. However, this phenomenon cause severe problem when running a learning process of the aforementioned AI is performed using a spin memristor.

Although a writing signal is applied with expecting conductance change of the memristor corresponding to weight update amount of the neural network which is calculated during the learning process, the conductance of the memristor does not change due to the trapping phenomenon. Accordingly, optimization of the network by a learning algorithm is hindered, and the network fails to perform as originally expected.

The present invention was made in consideration of the aforementioned situation and provides a neuromorphic device that can have appropriate conductance change by the writing signal even when the neuromorphic device uses a memristor element in which such a trapping phenomenon occurs and a control method thereof.

A neuromorphic device according to an aspect of the present invention includes a control unit. The control unit is configured to be connectable to a memristor having electrical characteristics in which conductance change occurs stochastically when a writing signal is applied to the memristor. The control unit is configured to apply the writing signal to the memristor. The writing signal is determined based on a necessary value of the conductance change amount of the memristor which is calculated from an update value of a weight of a neural network and an expected value by which the conductance of the memristor changes when a reference writing signal is applied to the memristor.

BRIEF DESCRIPTION OF THE DRAWINGS

FIG. 1 is a conceptual diagram of a first example of a neural network which is mimicked by a neuromorphic device according to a first embodiment.

DETAILED DESCRIPTION

Figure 2:
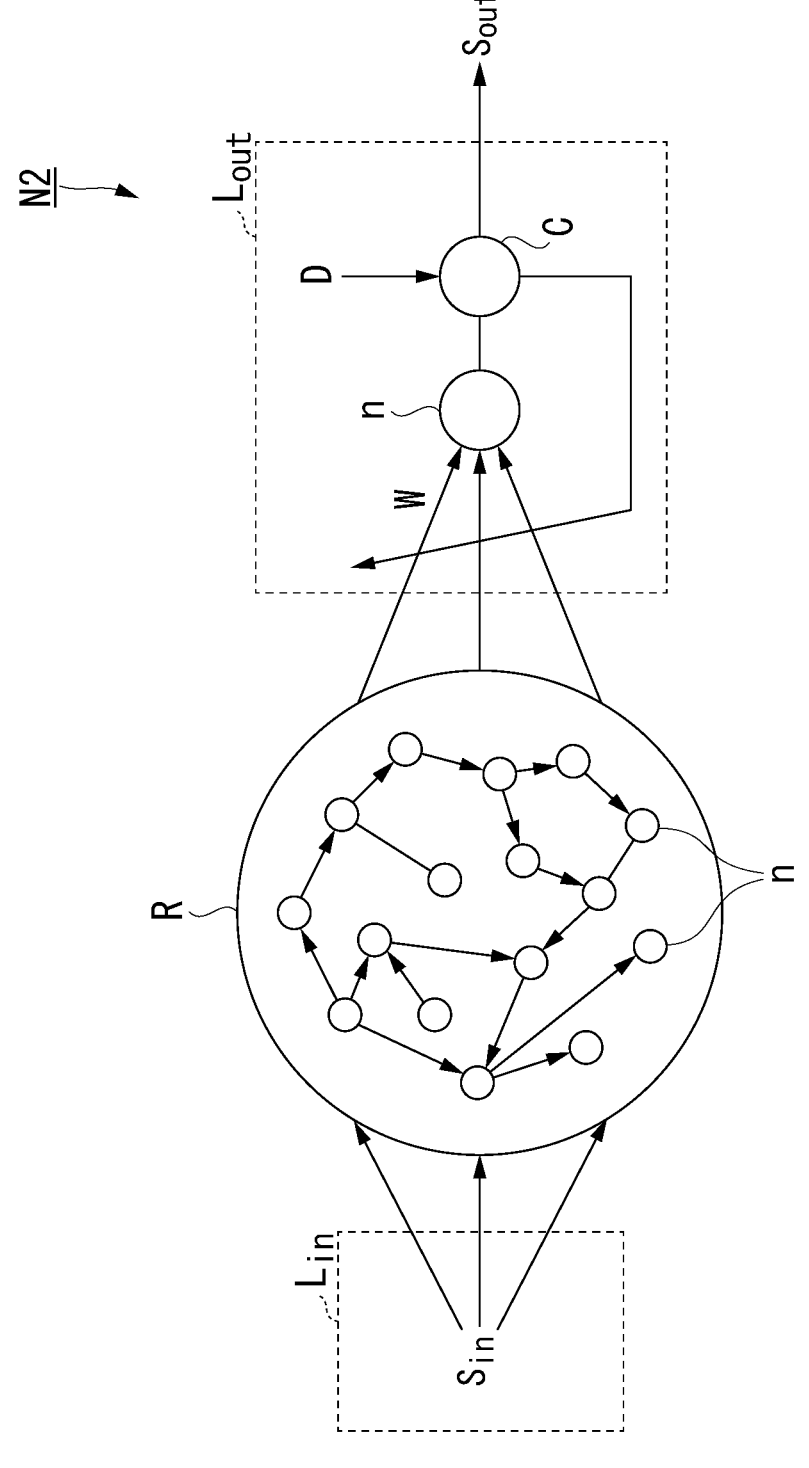
FIG. 2 is a conceptual diagram of a second example of the neural network which is mimicked by the neuromorphic device according to the first embodiment.

Hereinafter, an embodiment will be described in detail with appropriate reference to the accompanying drawings. In the drawings used in the following description, feature parts may be enlarged for the purpose of easy understanding of features of the present invention, and a specific configuration of each constituent may be different from an actual one. The configuration and the like described in the following description are only examples, and the present invention is not limited thereto and can be appropriately modified within a range in which advantageous effects of the present invention can be achieved.

First Embodiment

A neuromorphic device according to a first embodiment can be used as a multi-layer neural network called a multi-layer perceptron.

Figure 1:
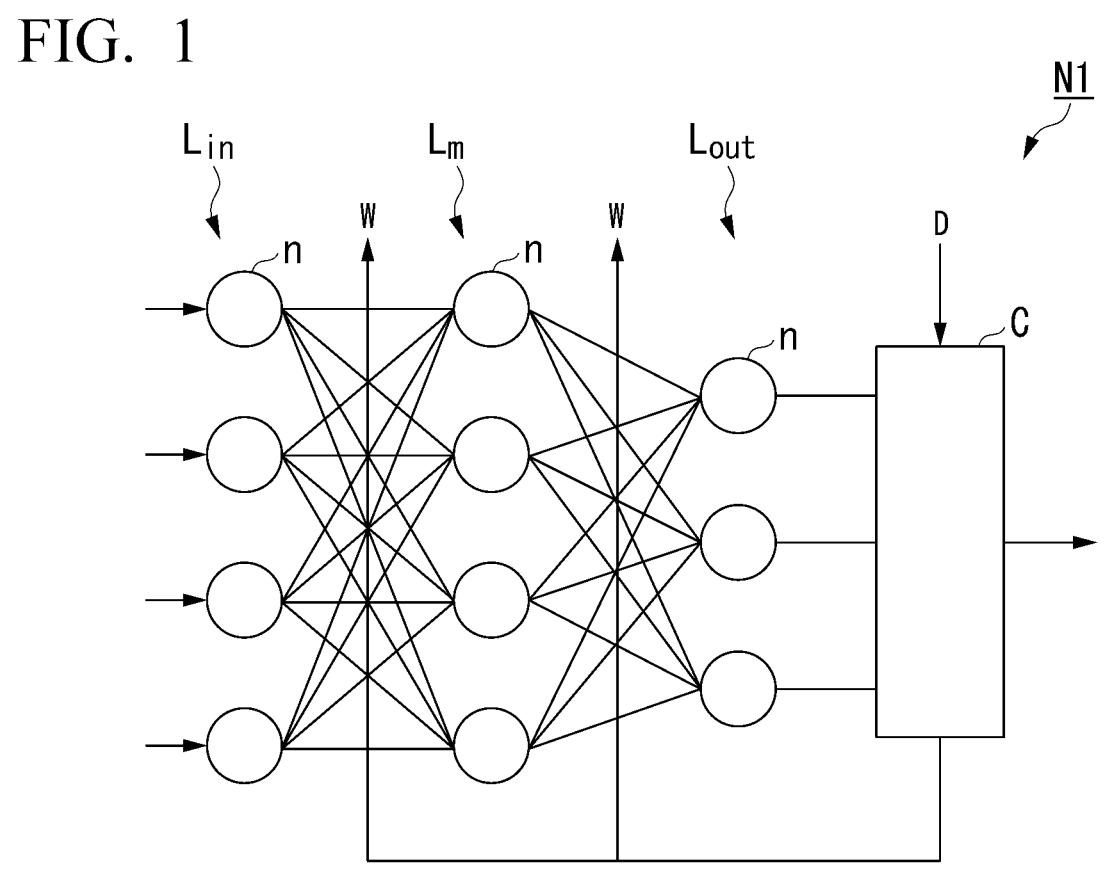

FIG. 1 is a conceptual diagram of a first example of a neural network which is mimicked by a neuromorphic device according to the first embodiment. The neural network N1 illustrated in FIG. 1 is a feed-forward neural network in which nodes are formed in a hierarchical shape.

The neural network N1 illustrated in FIG. 1 includes, for example, an input layer $L_{in}$, an intermediate layer $L_m$, and an output layer $L_{out}$. The input layer $L_{in}$, the intermediate layer $L_m$, and the output layer $L_{out}$ each include a plurality of nodes n.

Here, an example in which the number of intermediate layers $L_m$ is one is described, but a plurality of intermediate layers $L_m$ may be present between the input layer $L_{in}$ and the output layer $L_{out}$. Full connect layer, where all the nodes n are connected, is described, but some nodes n may not be connected with other nodes, or connection where a node n in a post layer is connected to a node n in a previous layer may be employed. The neural network N1 may be, for example, a convolutional neural network (CNN) or a recurrent neural network (RNN).

A node n corresponds to a neuron in neural circuitry, and connection between the nodes n corresponds to a synapse. In the example illustrated in FIG. 1, a node n in the input layer $L_{in}$ is connected to a node n in the intermediate layer $L_m$, and a node n in the intermediate layer $L_m$ is connected to a node n in the output layer $L_{out}$.

A connecting weight W is set between a node n in the input layer $L_{in}$ and a node n in the intermediate layer $L_m$ and between a node n in the intermediate layer $L_m$ and a node n in the output layer $L_{out}$. The connecting weight W is adjusted based on a result of comparison between an output of the output layer $L_{out}$ and training data D using a comparator C. The connecting weight W is determined in a learning process.

In the neural network N1, the connecting weight W between the layers is optimized using a method such as a backpropagation method. The backpropagation method is used in batch learning. In batch learning, an error between an output of the neural network N1 and the training data is calculated by a batch size consisted from one or more pieces of learning data. The backpropagation method is a learning method of calculating a ratio of contribution of a node in a previous layer from the layer closer to the output layer $L_{out}$ on the basis of the error and calculating an update value of the connecting weight W between the layers in the neural network N1.

Here, an example of a neural network realized by a neuromorphic device is described, but the mathematical model of the neural network is not limited to the example.

For example, the neuromorphic device according to the first embodiment can also be applied to a physical reservoir. Physical reservoir is an implementation of the reservoir calculation by a physical device.

A neural network N2 illustrated in FIG. 2 includes an input layer $L_{in}$, a reservoir layer R, and an output layer $L_{out}$. The input layer $L_{in}$ and the output layer $L_{out}$ are connected to the reservoir layer R.

The input layer $L_{in}$ inputs an input signal $S_{in}$ to the reservoir layer R. The input signal $S_{in}$ may be input to the reservoir layer R directly without passing through the input layer $L_{in}$. The input signal $S_{in}$ may be weighted and then input to the reservoir layer R.

The reservoir layer R stores the input signal $S_{in}$ input from the input layer $L_{in}$ and converts the input signal to another signal. The reservoir layer R includes a plurality of nodes n.

In the reservoir layer R, the connecting weight between the nodes n has a fixed value set based on a pre-designed connecting coefficient or the like, and the connecting weight between the nodes n is not generally a subject to learn. The connecting coefficient indicating the connecting weight between the nodes n is set, for example, by a random number. The connecting coefficient indicating the connecting weight between the nodes n may be set, for example, such that mutual information of an output signal and an expected signal is maximized.

An output of each node n propagates to another node n via an activation function, and the input signal $S_{in}$ change nonlinearly in the reservoir layer R. The input signal $S_{in}$ change with the elapse of time through interaction in the reservoir layer R.

In the reservoir layer R, the plurality of nodes n are randomly connected. For example, a signal output from one node n at time t may return to the node n itself at time t+1. The node n performs a process in consideration of the signals at time t and at time t+1, and information is recurrently processed.

The output layer $L_{out}$ receives an input of a signal from the reservoir layer R and outputs an output signal $S_{out}$ based on the input signal. The output layer $L_{out}$ outputs a desired output signal by calculating a product/sum of output values of the nodes in the reservoir layer R and the connecting weight W given to connecting between the reservoir layer R and the output layer $L_{out}$. The output layer is illustrated as a single layer in FIG. 2, but may include multiple layers. In the learning process, the comparator C compares the training data D with the output signal from the output layer $L_{out}$ and adjusts the connecting weight W between a node n in the reservoir layer R and a node n in the output layer $L_{out}$. The connecting weight W is determined in the learning process. In an inference process, the output layer $L_{out}$ outputs an inference result based on the input signal $S_{in}$ and the connecting weight W as the output signal $S_{out}$.

The neuromorphic device according to the first embodiment can be applied to an analog product/sum calculator that weights the output layer $L_{out}$ in the neural network N2. For example, the neuromorphic device according to the first embodiment is connected to an output terminal of a physical device for realizing the reservoir layer R via a control circuit. For example, when it is intended to obtain M outputs from N output terminals of reservoir layers R, a memristor array corresponding to a matrix of N rows and M columns is fabricated by neuromorphic device.

Figure 3:
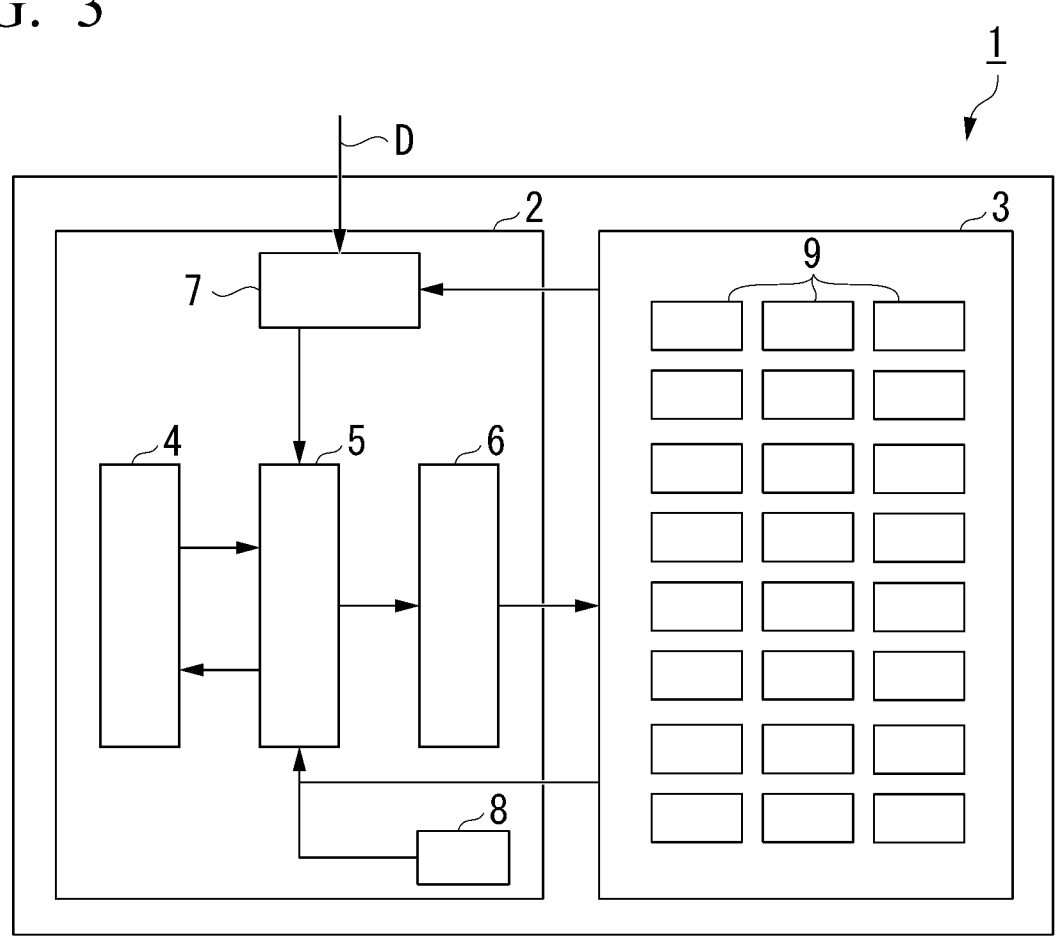
FIG. 3 is a diagram schematically illustrating the neuromorphic device according to the first embodiment.

FIG. 3 is a diagram schematically illustrating the neuromorphic device according to the first embodiment. The neuromorphic device 1 includes a control unit 2 and a memristor array 3.

The control unit 2 includes, for example, a memory 4, a processor 5, a writing signal generator 6, a comparator 7, and a temperature sensor 8. The memristor array 3 includes, for example, a plurality of memristors 9. The memristor array 3 performs an analog product/sum calculating operation of calculating a product of a propagating signal and the connecting weight W and calculating a sum of the calculated products. The control unit 2 controls operation of the memristors 9 in the memristor array 3.

The memory 4 stores, for example, an operation program for operating the processor 5. The memory 4 stores an expected value by which conductance of a memristor 9 changes when a reference writing signal is applied to the memristor 9. The expected value is a conductance change of an actual element which considers a probability calculated by a probability model. The probability model is generated by a probability of conductance change of the memristor 9 and a conductance change amount when the reference writing signal is applied to the memristor 9.

The processor 5 operates, for example, based on the operation program stored in the memory 4. The processor 5 calculates an update value $\Delta W$ of the connecting weight W, for example, based on a signal input from the comparator 7. The processor 5 calculates a necessary value of the conductance change amount of the memristor 9 from the update value $\Delta W$. The processor 5 sets an appropriate value from expected values stored in the memory 4, based on, for example, a position of the memristor 9 in the memristor array 3 or temperature information measured by the temperature sensor 8. A specific method of setting the expected value will be described later.

The processor 5 determines conditions of a writing signal from the necessary value and the expected value of the conductance change amount of the memristor 9. The processor 5 is not limited to a microprocessor. For example, a circuit programmed onto a PLD device such as an FPGA or an ASIC may be used. An external PC may be used instead of the processor 5.

The writing signal generator 6 applies the writing signal to a predetermined memristor 9 in accordance with an instruction from the processor 5. The writing signal generator 6 applies a pulse voltage as the writing signal to the memristor 9. The writing signal is electrical signal which is defined by an applied voltage, an applied current, a pulse length, a pulse interval, a pulse frequency, and the like applied to the memristor 9.

The comparator 7 corresponds to the comparator C in the neural networks N1 and N2. The comparator 7 calculates an error between the training data D and the output signal and determines an update value for updating the connecting weight W based on the error. In FIG. 3, the training data D is input from the outside, but the training data D may be stored in the memory 4 in advance.

The temperature sensor 8 measures a temperature at which the neuromorphic device 1 operates. A known temperature sensor can be used as the temperature sensor 8. Although details will be described later, the expected value varies depending on the temperature in some physical phenomena used in the neuromorphic device 1 and thus the writing signal can be more precisely set by measuring the temperature at which the neuromorphic device 1 operates.

Figure 4:
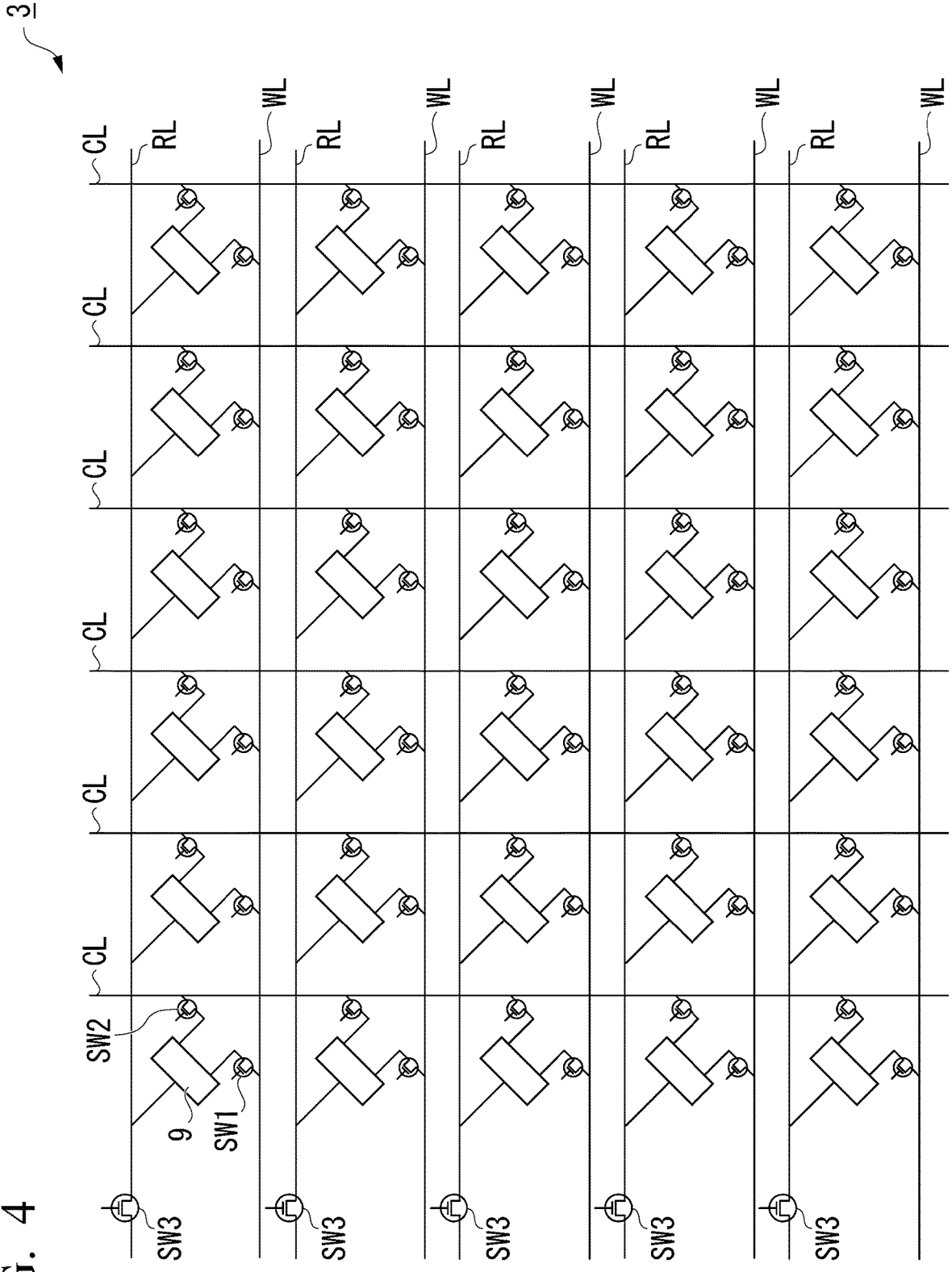
FIG. 4 is a circuit diagram of a memristor array of the neuromorphic device according to the first embodiment.

FIG. 4 is a circuit diagram of the memristor array 3 of the neuromorphic device 1 according to the first embodiment. The memristor array 3 includes, for example, a plurality of memristors 9, a plurality of writing lines WL, a plurality of common lines CL, a plurality of reading lines RL, a plurality of first switches SW1, a plurality of second switches SW2, and a plurality of third switches SW3.

The memristors 9 are arranged, for example, in a matrix shape. The memristors 9 are not limited to arrangement of actual elements in a matrix shape, but may be arranged in a matrix in terms of circuit diagram.

Each writing lines WL is used to write data to the corresponding memristor 9. Each common line CL is used to write data to the corresponding memristor 9 and to read data from the memristor 9. The common line CL may be provided in each of the plurality of memristors 9 independently or may be provided for the plurality of memristors 9 commonly. Each reading line RL is used to read data from the corresponding memristor 9.

The first switches SW1, the second switches SW2, and the third switches SW3 are elements for controlling a flow of a current. Each of the first switches SW1, the second switches SW2, and the third switches SW3 may be, for example, a transistor, an element using phase change of a crystal layer such as an ovonic threshold switch (OTS), an element using change of a band structure such as a metal insulator transition (MIT) switch, an element using a breakdown voltage such as a Zener diode or an avalanche diode, or an element of which conductivity changes with change in atom position. Each memristor 9 is connected to the first switch SW1, the second switch SW2, and the third switch SW3, and the operation thereof is controlled by the first switch SW1, the second switch SW2, and the third switch SW3.

Figure 5:
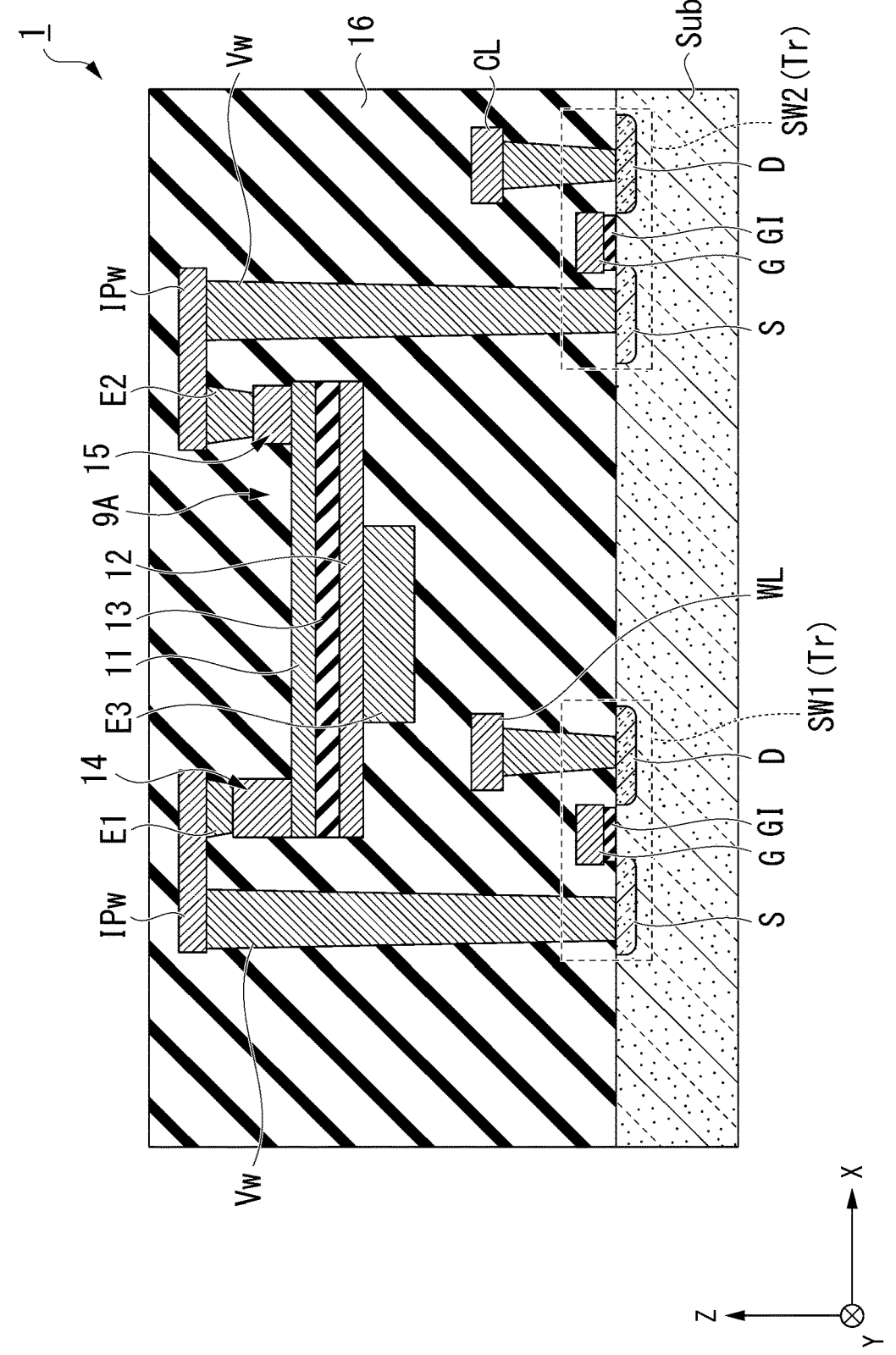
FIG. 5 is a sectional view of the vicinity of a memristor of the neuromorphic device according to the first embodiment.

FIG. 5 is a sectional view of the vicinity of a magnetic domain wall moving element 9A of the neuromorphic device 1 according to the first embodiment. The magnetic domain wall moving element 9A illustrated in FIG. 5 is an example of a memristor 9. The memristor 9 has electrical characteristics in which conductance change occurs stochastically when a writing signal is applied thereto. The memristor 9 is not limited to the magnetic domain wall moving element 9A and may be, for example, a phase-change memory (PCM), a resistance-change memory (ReRAM), or a ferroelectric transistor (FeFET).

The first switch SW1 and the second switch SW2 illustrated in FIG. 5 are transistors Tr. Each transistor Tr includes a gate electrode G, a gate insulating film GI, and a source S and a drain D formed in a substrate Sub. The source S and the drain D are determined by a flow direction of a current and both are active regions of semiconductor. FIG. 5 illustrates only an example, and the positional relationship between the source S and the drain D may be inverted. The substrate Sub is, for example, a semiconductor wafer. The third switch SW3 is provided, for example, at a position departing in a y direction in FIG. 5.

The transistors Tr, the writing line WL, the common line CL, the reading line RL, and the magnetic domain wall moving element 9A are connected through via-wirings Vw extending in a z direction or in-plane wirings IPw extending in one direction of an xy plane. The via-wiring Vw and the in-plane wiring IPw include a conductive material. An insulating layer 16 in addition to the via-wirings Vw is formed between different layers in the z direction.

The insulating layer 16 is an insulating for insulating lines of a multi-layered wirings or elements. The magnetic domain wall moving element 9A and the transistors Tr are electrically isolated by the insulating layer 16 except the via-wirings Vw and the in-plane wirings IPw. The insulating layer 16 is formed of, for example, silicon oxide ($SiO_x$), silicon nitride ($SiN_x$), silicon carbide (SiC), chromium nitride (CrN), silicon carbonitride (SiCN), silicon oxynitride (SiON), aluminum oxide ($Al_2O_3$), or zirconium oxide ($ZrO_x$).

Figure 6:
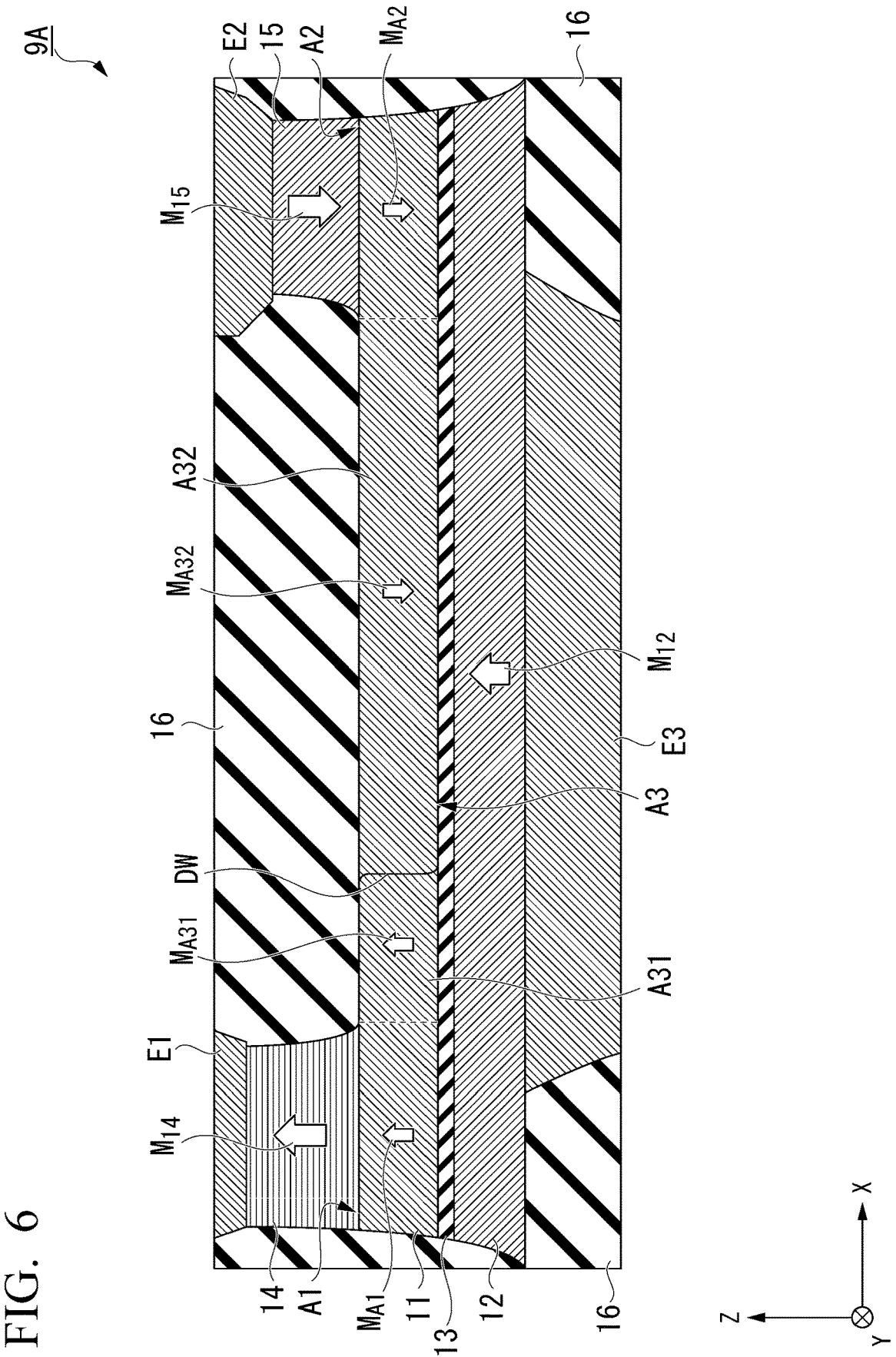
FIG. 6 is an enlarged sectional view of the vicinity of a memristor of the neuromorphic device according to the first embodiment.

FIG. 6 is an enlarged sectional view of the vicinity of a magnetic domain wall moving element 9A of the neuromorphic device 1 according to the first embodiment.

The magnetic domain wall moving element 9A includes, for example, a first ferromagnetic layer 11, a second ferromagnetic layer 12, a nonmagnetic layer 13, a first magnetization fixed layer 14, a second magnetization fixed layer 15, a first electrode E1, a second electrode E2, and a third electrode E3.

The first ferromagnetic layer 11 has a more length in the x direction than a length in the y direction when seen in the z direction. The first ferromagnetic layer 11 includes two magnetic domains therein and a magnetic domain wall DW at a boundary between the two magnetic domains. The first ferromagnetic layer 11 includes a first magnetized area A1, a second magnetized area A2, and a third magnetized area A3.

The first magnetized area A1 is an area in which an alignment direction of a magnetization $M_{A1}$ is fixed to one direction. When it is mentioned that a magnetization is fixed, it means that the magnetization is not inverted in a normal operation of the magnetic domain wall moving element 9A (in which a larger external force than conceivable is not applied). The first magnetized area A1 is, for example, an area overlapping the first magnetization fixed layer 14 when seen in the z direction in the first ferromagnetic layer 11. The magnetization $M_{A1}$ of the first magnetized area A1 is fixed, for example, by a magnetization $M_{14}$ of the first magnetization fixed layer 14.

The second magnetized area A2 is an area in which an alignment direction of a magnetization $M_{A2}$ is fixed to one direction. The alignment direction of the magnetization $M_{A2}$ of the second magnetized area A2 is different from the alignment direction of the magnetization $M_{A1}$ of the first magnetized area A1. The alignment direction of the magnetization $M_{A2}$ of the second magnetized area A2 is, for example, opposite to the alignment direction of the magnetization $M_{A1}$ of the first magnetized area A1. The second magnetized area A2 is, for example, an area overlapping the second magnetization fixed layer 15 when seen in the z direction in the first ferromagnetic layer 11. The magnetization $M_{A2}$ of the second magnetized area A2 is fixed, for example, by a magnetization $M_{15}$ of the second magnetization fixed layer 15.

The third magnetized area A3 is an area other than the first magnetized area A1 and the second magnetized area A2 in the first ferromagnetic layer 11. The third magnetized area A3 is, for example, an area interposed between the first magnetized area A1 and the second magnetized area A2 in the x direction.

The third magnetized area A3 is an area in which a magnetization direction changes and the magnetic domain wall DW can move. The third magnetized area A3 is referred to as a magnetic domain wall movable area. The third magnetized area A3 includes a first magnetic domain A31 and a second magnetic domain A32. The first magnetic domain A31 and the second magnetic domain A32 are inverted in alignment direction of a magnetization. A boundary between the first magnetic domain A31 and the second magnetic domain A32 are the magnetic domain wall DW. A magnetization $M_{A31}$ of the first magnetic domain A31 is aligned, for example, in the same direction as the magnetization $M_{A1}$ of the first magnetized area A1. A magnetization $M_{A32}$ of the second magnetic domain A32 is aligned, for example, in the same direction as the magnetization $M_{A2}$ of the neighboring second magnetized area A2. In principle, the magnetic domain wall DW moves in the third magnetized area A3 and does not invade the first magnetized area A1 and the second magnetized area A2.

When a volume ratio between the first magnetic domain A31 and the second magnetic domain A32 in the third magnetized area A3 changes, the magnetic domain wall DW moves. The magnetic domain wall DW moves by applying a writing signal (a pulse voltage) in the x direction of the third magnetized area A3.

The first ferromagnetic layer 11 is formed of a magnetic substance. The first ferromagnetic layer 11 may be formed of a ferromagnetic substance, a ferrimagnetic substance, or a combination of an antiferromagnetic substance capable of changing a magnetic state using a current therewith. It is preferable that the first ferromagnetic layer 11 includes at least one element selected from a group consisting of Co, Ni, Fe, Pt, Pd, Gd, Tb, Mn, Ge, and Ga.

Examples of a material used for the first ferromagnetic layer 11 include a stacked film of Co and Ni, a stacked film of Co and Pt, a stacked film of Co and Pd, a MnGa-based material, a GdCo-based material, and a TbCo-based material. With a ferrimagnetic substance such as a MnGa-based material, a GdCo-based material, and a TbCo-based material, a saturated magnetization is small and a threshold current required for moving the magnetic domain wall DW is small. With a stacked film of Co and Ni, a stacked film of Co and Pt, a stacked film of Co and Pd, a coercivity is large and a moving speed of the magnetic domain wall DW is low.

The nonmagnetic layer 13 is interposed between the first ferromagnetic layer 11 and the second ferromagnetic layer 12. The nonmagnetic layer 13 hinders magnetic coupling between the first ferromagnetic layer 11 and the second ferromagnetic layer 12. The nonmagnetic layer 13 is stacked on one surface of the second ferromagnetic layer 12.

The nonmagnetic layer 13 is formed of, for example, a nonmagnetic insulating material, a semiconductor, or a metal. For example, it is preferable that the nonmagnetic layer 13 is a nonmagnetic insulating material. Examples of the nonmagnetic insulating material include $Al_2O_3$, $SiO_2$, MgO, $MgAl_2O_4$, and a material in which a part of Al, Si, or Mg thereof is replaced with Zn, Be, or the like. These materials have a large band gap and excellent insulation properties. Examples of the nonmagnetic insulating material include oxides including Mg or Al. When the nonmagnetic layer 13 is formed of a nonmagnetic insulating material, the nonmagnetic layer 13 is a tunnel barrier layer. Examples of the nonmagnetic metal include Cu, Au, and Ag. Examples of the nonmagnetic semiconductor include $S_{in}$, Ge, $CuInSe_2$, $CuGaSe_2$, and $Cu(In, Ga)Se_2$.

The second ferromagnetic layer 12 interposes the non-magnetic layer 13 along with the first ferromagnetic layer 11 therebetween. At least a part of the second ferromagnetic layer 12 is located at a position overlapping the third magnetized area A3 in the z direction. The second ferromagnetic layer 12 is located, for example, closer to the substrate Sub than the first ferromagnetic layer 11. The positional relationship in the stacking direction of the first ferromagnetic layer 11 and the second ferromagnetic layer 12 may be inverted.

The magnetization $M_{12}$ of the second ferromagnetic layer 12 is less likely to be inverted than the magnetization of the third magnetized area A3 of the first ferromagnetic layer 11. The magnetization $M_{12}$ of the second ferromagnetic layer 12 does not change in direction and is fixed when an external force that can invert the magnetization of the third magnetized area A3 is applied thereto. The second ferromagnetic layer 12 may be referred to as a fixed layer or a reference layer.

The second ferromagnetic layer 12 is formed of a ferromagnetic substance. The second ferromagnetic layer 12 includes, for example, a material capable of easily providing a coherent tunneling effect between the first ferromagnetic layer 11 and the second ferromagnetic layer 12. The second ferromagnetic layer 12 includes, for example, a metal selected from a group consisting of Cr, Mn, Co, Fe, and Ni, an alloy including one or more of such metals, or an alloy including such metals and one or more elements of B, C, and N. Examples of the second ferromagnetic layer 12 include Co—Fe, Co—Fe—B, Ni—Fe, and a Heusler alloy.

The first magnetization fixed layer 14 is connected to the first ferromagnetic layer 11. The first magnetization fixed layer 14 is connected to the first magnetized area A1 of the first ferromagnetic layer 11. The first magnetization fixed layer 14 is formed of, for example, a ferromagnetic substance. The first magnetization fixed layer 14 can employ, for example, the same material as the first ferromagnetic layer 11 or the second ferromagnetic layer 12. The first magnetization fixed layer 14 includes a plurality of layers and may have a synthetic antiferromagnetic structure (an SAF structure).

The second magnetization fixed layer 15 is connected to the first ferromagnetic layer 11 at a position separated in the x direction from the first magnetization fixed layer 14. The second magnetization fixed layer 15 is connected to the second magnetized area A2 of the first ferromagnetic layer 11. The second magnetization fixed layer 15 can employ the same material as the first magnetization fixed layer 14. The thickness of the second magnetization fixed layer 15 may be different from, for example, the thickness of the first magnetization fixed layer 14.

The first electrode E1 is connected to the first magnetization fixed layer 14. The second electrode E2 is connected to the second magnetization fixed layer 15. The third electrode E3 is connected to the second ferromagnetic layer 12. Each of the first electrode E1, the second electrode E2, and the third electrode E3 is formed of a conductive material.

The magnetic domain wall moving element 9A can be manufactured by repeating a film forming step of forming the layers and a processing step of processing the layers in a predetermined shape. The film forming step can be performed, for example, using a sputtering method or a chemical vapor deposition (CVD) method. The processing step can be performed, for example, using photolithography.

The conductance of the magnetic domain wall moving element 9A varies depending on the position of the magnetic domain wall DW. The magnetic domain wall DW may be trapped by potential change due to a groove formed at the time of manufacturing or the like. In this case, the conductance of the magnetic domain wall moving element 9A does not cause desired conductance change even when a writing signal is applied thereto. Whether the magnetic domain wall DW is to be trapped is determined stochastically. The probability that the magnetic domain wall DW is trapped changes depending on a position of the magnetic domain wall DW in the first ferromagnetic layer 11, an operation temperature of the neuromorphic device 1, an external magnetic-field environment, a local magnetic-field environment which may be generated between elements, a position of the magnetic domain wall moving element 9A in the neuromorphic device 1, a position in a plane of the semiconductor wafer at the time of manufacturing, or the like. The magnetic domain wall moving element 9A has electrical characteristics in which a conductance change occurs stochastically when a writing signal is applied thereto.

The operation of the neuromorphic device 1 will be described below. The neuromorphic device 1 electrically performs learning and inference of a neural network.

Figure 7:
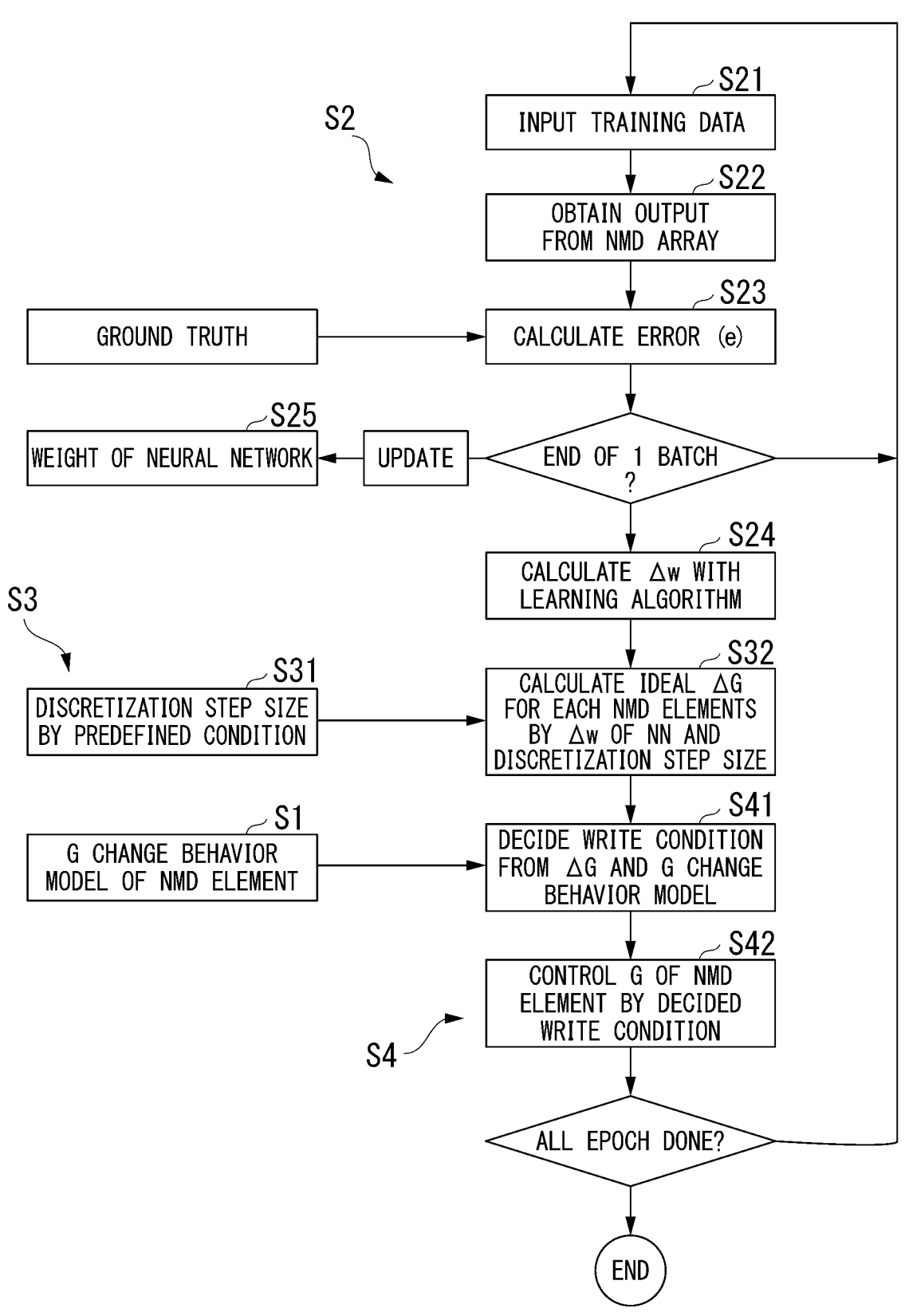
FIG. 7 is a flowchart illustrating a case in which the neuromorphic device according to the first embodiment conducts learning through batch learning.
Figure 10:
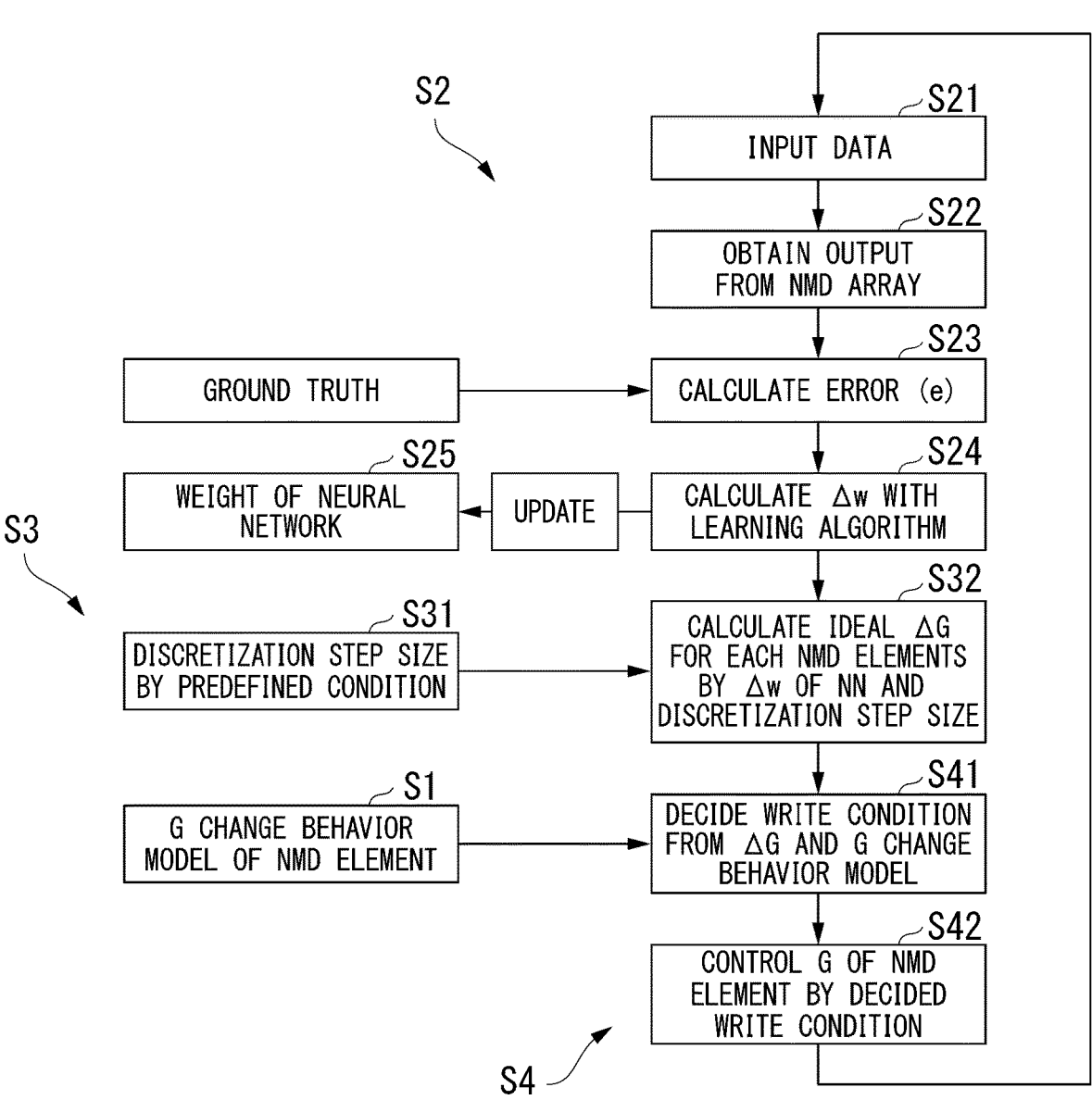
FIG. 10 is a flowchart illustrating a case in which the neuromorphic device according to the first embodiment conducts learning through online learning.

Roughly, the learning of a neural network includes batch learning (which includes mini batch learning) and online learning. FIG. 7 is a flowchart when learning is performed through the batch learning. FIG. 10 is a flowchart when learning is performed through the online learning.

In the batch learning, data used for learning is input by the number of pieces of data in an update unit (a batch size). In the batch learning, an update value ΔW of each connecting weight W is calculated from a difference between an inference result from the neural network using the input data and training data, and the connecting weight W is updated.

The batch learning is repeatedly performed until the weights are optimized through the learning. At the time of inference at which the learning has been completed and the connecting weights have been optimized, the connecting weights W are fixed and used without being changed in general.

On the other hand, in the online learning, the learning is performed sequentially using the inference results in response to the input data. For example, in the online learning, a model of the neural network is gradually improved using a method such as a recursive least square method. FORCE learning is an example of the online learning. With the online learning, when time-series signals are input from a sensor or the like, identification criteria or the like can be adaptively corrected according to the use environment, individual differences within objects to be sensed, or the like.

A method of controlling the neuromorphic device 1 will be first described with reference to the flowchart for the batch learning illustrated in FIG. 7. The method of controlling the neuromorphic device 1 includes a preliminary evaluation step S1, a weight updating step S2, a conductance converting step S3, and a signal determining step S4.

The preliminary evaluation step S1 is a step of calculating an expected value by which the conductance of a memristor 9 changes when a reference writing signal is applied to the memristor 9.

The conductance of a memristor 9 may not cause a desired conductance change even when a writing signal is applied thereto. Whether a desired conductance change occurs is determined stochastically. The expected value is calculated, for example, a product of the probability that the conductance of the memristor 9 changes when the reference writing signal is applied to the memristor 9 and an ideal value when the conductance of the memristor 9 changes ideally when the reference writing signal is applied to the memristor 9. The conductance change is given by a probability model.

The ideal value is an ideal change amount of the memristor 9's conductance. The ideal value can be calculated, for example, by simulation. The ideal value may be calculated as a mode of the conductance change amount when the reference writing signal is applied to the memristor 9 100 times. The ideal value is a fixed value under the condition that the reference writing signal is constant. Accordingly, the expected value may be a probability that the conductance of the memristor 9 will change when the reference writing signal is applied to the memristor 9.

The reference writing signal can be arbitrarily set. For example, in the magnetic domain wall moving element 9A, a writing pulse with which the magnetic domain wall DW moves sufficiently in a part in which there is no trap of the magnetic domain wall is used as the reference writing signal. For example, in the magnetic domain wall moving element 9A, the reference writing signal is determined by defining the height, the width, the application times, the pulse interval, and the like of the writing pulse.

The probability that the conductance of the memristor 9 will change when the reference writing signal is applied to the memristor 9 changes due to various reasons. For example, in the magnetic domain wall moving element 9A, the probability that the magnetic domain wall DW will move normally and the conductance will change ideally changes depending on the position of the magnetic domain wall DW in the first ferromagnetic layer 11, the operation temperature of the neuromorphic device 1, the local magnetic-field environment between elements, the external magnetic-field environment, a local magnetic field which may be generated between the elements, the physical position of the magnetic domain wall moving element 9A in the memristor array 3, and the like. For example, the physical position of the magnetic domain wall moving element 9A in the memristor array 3 can be converted to a physical position in a substrate (a semiconductor wafer) in which the memristor array 3 is formed. Depending on the physical position, performance of the magnetic domain wall moving element 9A may differ and behavior of the conductance change may differ.

In the preliminary evaluation step S1, an expected value for each condition is calculated in advance. In the preliminary evaluation, a probability model may be prepared using an evaluation sample which is manufactured under the same conditions as an actual product. The preliminary evaluation may be performed using at least one memristor 9 out of a plurality of memristors 9 used for an actual product. The probability model based on the preliminary evaluation may be set to a constant based on an average of results of evaluation of a plurality of memristors 9 used for an actual product. Separately from the memristors 9 used for an actual operation, a reference element used for the preliminary evaluation may be fabricated into the memristor array 3. In this case, the preliminary evaluation step S1 can be performed at an arbitrary timing even when products have been shipped.

Information of the expected values evaluated in the preliminary evaluation step S1 is stored, for example, as an expected value table in the memory 4. The expected values may be stored as a probability model prepared in the preliminary evaluation step S1 in the memory 4. When the probability distribution of the conductance change conforms to a specific probability distribution, parameters thereof may be stored in the memory 4. For example, when the probability distribution of the conductance change conforms to a normal distribution or is similar to a normal distribution, an average and a variance may be stored in the memory 4. In the memory 4, averages and variances corresponding to all the elements may be stored or averages and variances of some elements may be stored.

The weight updating step S2 includes an input step S21, an inference step S22, an error measuring step S23, an update value calculating step S24, and a weight determining step S25. The weight updating step S2 is performed, for example, by the processor 5.

In the weight updating step S2, the update value ΔW of a connecting weight W is calculated through learning using a neural network. The weight updating step S2 is performed by a neural network which is expressed using computation resources with a higher arithmetic resolution than that of the memristor 9.

The memristor 9 does not completely represent analog linear conductance change characteristics and has a limited resolution. In other words, there is a limitation on the resolution of conductance that memristor 9 can have. The weight updating step S2 is performed using a neural network which is expressed using computation resources with a higher arithmetic resolution than the resolution of the conductance of the memristor 9. When an arithmetic operation of the neural network is performed by software, the arithmetic resolution can be changed by changing a word length of a parameter to which a weight is assigned, an arithmetic word length for calculating an activation function, or a length of a decimal part in a fixed-point arithmetic operation.

In the input step S21, data used for learning of the neural network is input by the number of pieces of data in the update unit (the batch size). In the inference step S22, the neural network outputs an inference result based on the input data. In the error measuring step S23, an error (e) between the output inference result and the training data is calculated. The input step S21, the inference step S22, and the error measuring step S23 are repeated until all the pieces of data corresponding to the input batch size are processed.

In the update value calculating step S24, an update value ΔW of a connecting weight W is determined based on a learning algorithm from the error between the inference result acquired from the comparator 7 and the training data. The learning algorithm is an algorithm for optimizing the connecting weights W of the neural network such that the error between the inference result and the training data decreases. In the weight determining step S25, by adding the update value ΔW to the pre-updated connecting weight W, and the connecting weight of the neural network are updated. When the update value ΔW is a negative, the connecting weight may be decreased as a result. The updated connecting weight W' can be calculated by adding the update value ΔW to the pre-updated connecting weights W.

In the conductance converting step S3, a necessary value of the conductance change amount of the memristor 9 is calculated from the update value ΔW of the connecting weights W. The conductance converting step S3 includes a discretization step size (quantization step size) setting step S31 and a necessary value determining step 832. The conductance converting step S3 is performed, for example, by the processor 5.

Calculation of the update value ΔW of the connecting weights is performed, for example, using the neural network which is expressed using computation resources with a higher arithmetic resolution than that of the menmristor 9. When the update value ΔW of the connecting weights calculated using the neural network is converted to the conductance change amount ΔG of the memristor 9 with a lower resolution, a quantization error is generated. This is because the neural network and the memristor 9 are different in arithmetic resolution. For example, when the update value ΔW calculated using a double-precision floating-point arithmetic operation is replaced with the conductance change amount ΔG of the memristor which changes discretely (digitally), approximation is necessary and an error is generated by this replacement.

In the discretization step size setting step S31, the discretization step size of the neural network and a range of a value (a dynamic range) which is possible in the neural network are set such that an error due to the difference in arithmetic resolution between the neural network and the memristor 9 decreases. For example, the discretization step size of the neural network is set in the order described in PCT International Publication No. WO2019/043990.

Discretization is conversion of continuous real numbers to preset discrete approximate values, and the discretization step size is a step width for the approximation. By designing the discretization step size of the neural network and the range of a value which is possible in the neural network depending on the memristor 9, it is possible to decrease an error when the update value ΔW calculated using the neural network is converted to the conductance change amount ΔG of the memristor 9.

In the necessary value determining step S32, the update value ΔW of the connecting weights is converted to the conductance change amount ΔG of the memristor 9 based on the discretization step size determined in the discretization step size (quantization step size) setting step S31.

Figure 8:
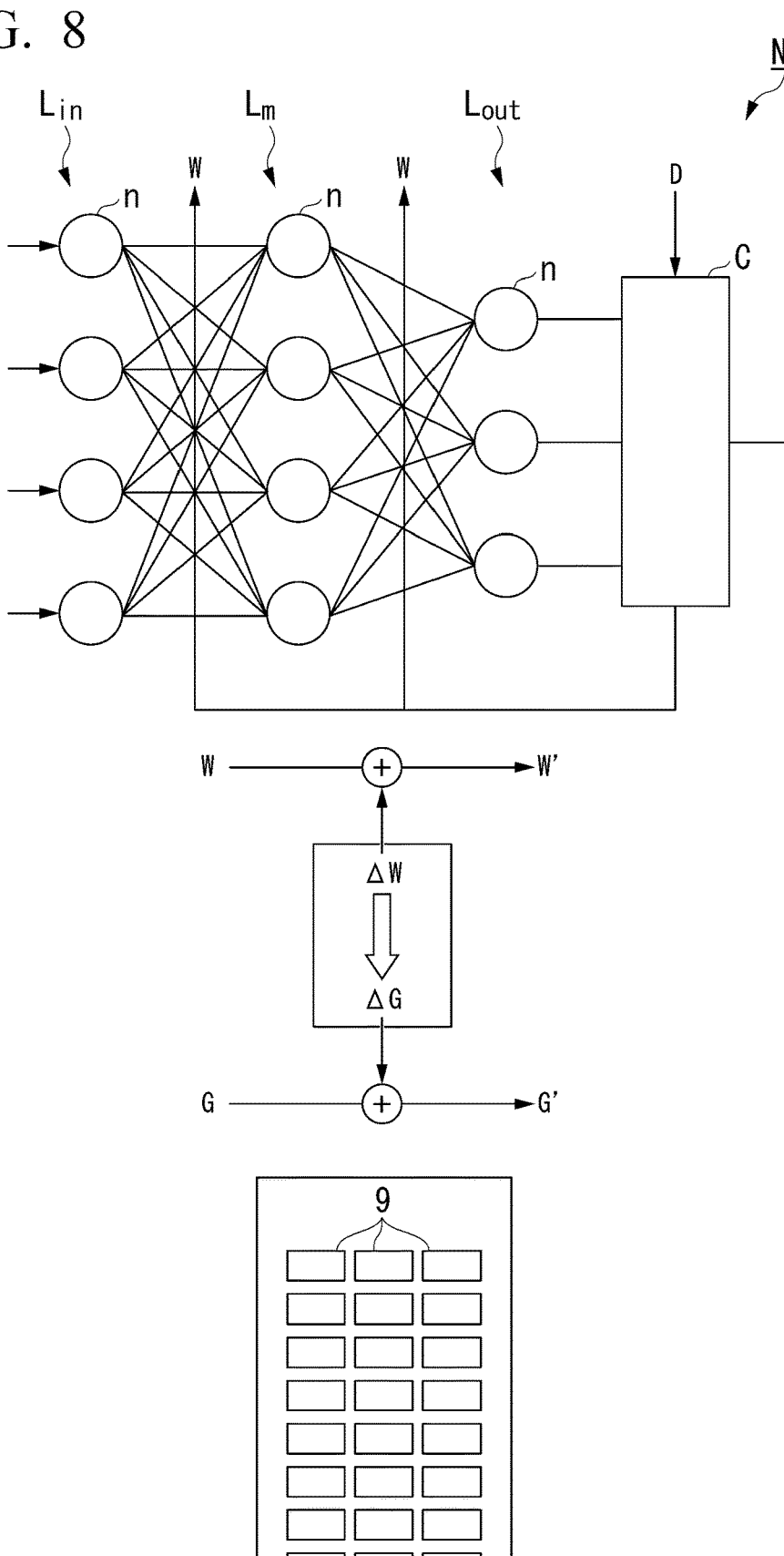
FIG. 8 is a conceptual diagram of a first example in which an update value of a connecting weight is converted to a conductance change amount.

FIG. 8 is a conceptual diagram of a first example in which the update value ΔW of the connecting weights W is converted to the conductance change amount ΔG. The connecting weights W in the neural network N1 are converted to connecting weights W' through updating, and a difference therebetween is the update value ΔW. On the other hand, the conductance G of the memristor 9 is converted to a conductance G' through updating, and a difference therebetween is the change amount ΔG. In the first example illustrated in FIG. 8, the update value ΔW is converted to the change value of ΔG by directly calculating the change value of ΔG as it were.

Figure 9:
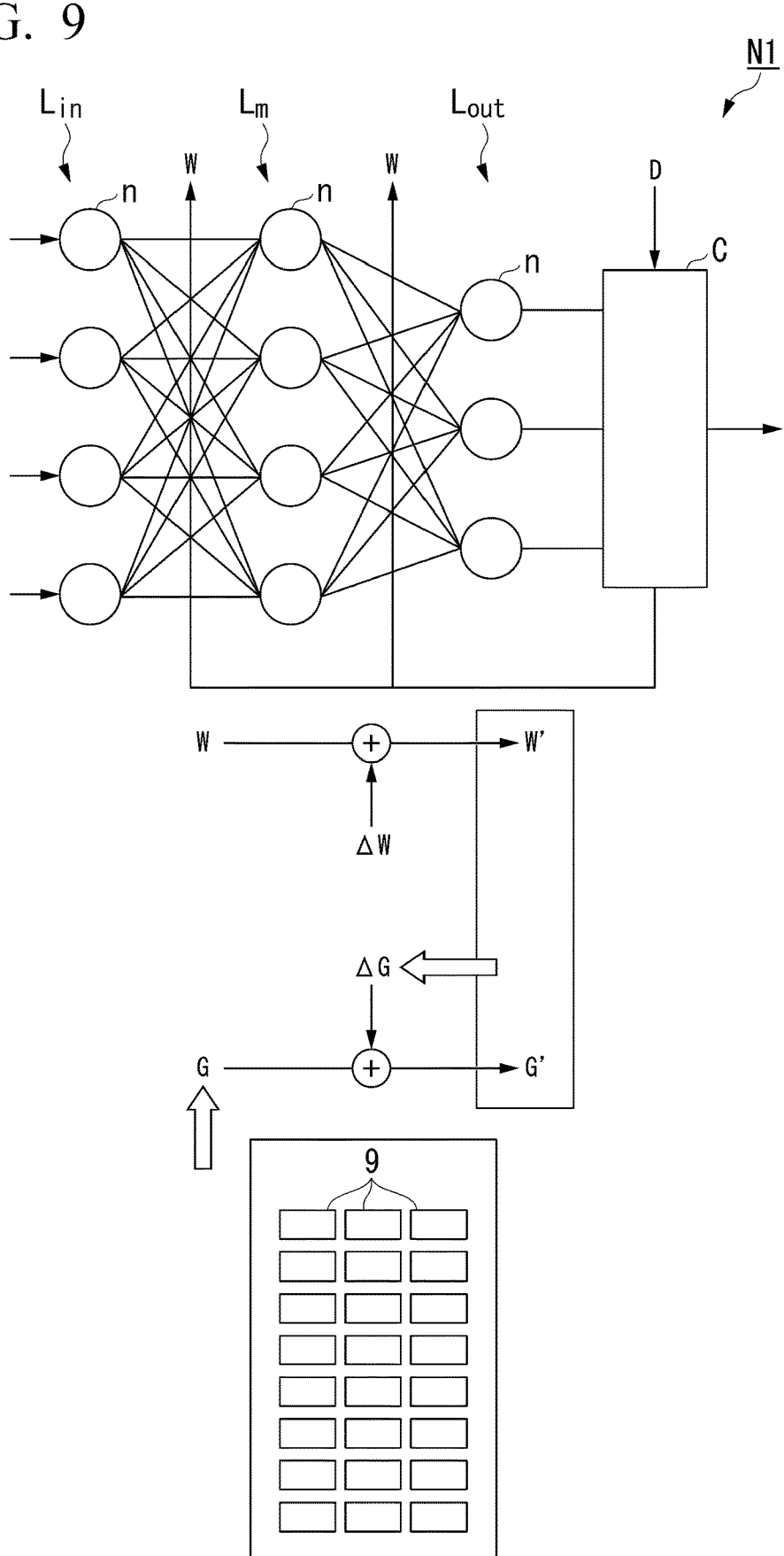
FIG. 9 is a conceptual diagram of a second example in which an update value $\Delta W$ of a connecting weight $W$ is converted to a conductance change amount $\Delta G$.

FIG. 9 is a conceptual diagram of a second example in which the update value ΔW of the connecting weights W is converted to the conductance change amount ΔG. In the second example illustrated in FIG. 9, the current conductance G of the memristor 9 is measured, and the conductance G' of the memristor 9 corresponding to the updated connecting weights W' of the neural network N1 is calculated. Then, the change amount ΔG is calculated from the difference between the conductance G' and the conductance G. In the second example illustrated in FIG. 9, the conductances G and G' are first obtained and then the change amount ΔG is calculated.

In the signal determining step S4, the writing signal which is actually applied to the memristor 9 is determined from the necessary value of the conductance change amount and the expected value of the conductance change. The signal determining step S4 includes a writing signal determining step S41 and a writing step S42.

The writing signal determining step S41 is performed, for example, by the processor 5. In the writing signal determining step S41, the writing signal is determined, for example, by calculating the expected value of the conductance change using a probability model which is optimized such that a posterior probability is maximized through Baysian estimation. The probability model which is used herein is the probability model which is acquired in advance from behavior of the conductance change of the memristor 9 in the preliminary evaluation step S1. For example, the probability model is stored in the memory 4 as a table of relationship between an ideal conductance change and the expected value of the conductance change which will be able to occur actually. The expected value can be acquired with reference to the table, and the writing signal to be applied to the memristor 9 is determined from the expected value and the necessary conductance change amount. The temperature or the magnitude of the magnetic-field environment affecting the probability that the conductance change will occur may be acquired using a sensor or the like and the expected value from the table may be additionally corrected. For example, by using a hidden Markov model as the probability model, movement of the magnetic domain wall DW in the magnetic domain wall moving element 9A may be able to be estimated from an observed value of the conductance change.

The processor 5 may determine the expected value with reference to information such as the pre-updated conductance of the memristor 9, an applied voltage of the reference writing signal, the temperature, and position information of the memristor 9 to be updated.

When the memristor 9 is a magnetic domain wall moving element 9A, the probability that the magnetic domain wall DW will be trapped increases as the magnitude of the applied voltage of the reference writing signal decreases. Accordingly, the magnitude of the applied voltage of the reference writing signal is one parameter that affects the expected value.

For example, when the memristor 9 is a magnetic domain wall moving element 9A, the pre-updated conductance of the memristor 9 corresponds to the position of the magnetic domain wall DW in the first ferromagnetic layer 11. Depending on the position of the magnetic domain wall DW, the probability that the magnetic domain wall DW will be trapped differs and the expected value by which the conductance changes as desired differs. Accordingly, the pre-updated conductance of the memristor 9 is one parameter that affects the expected value.

When the memristor 9 is a magnetic domain wall moving element 9A, the probability that the magnetic domain wall DW will be trapped differs depending on the local magnetic-field environment between the elements or the external magnetic-field environment. Accordingly, the magnetic-field environment is one parameter that affects the expected value.

When the memristor 9 is a magnetic domain wall moving element 9A, the magnetic domain wall DW is less likely to be trapped as the temperature becomes higher. Accordingly, the operation temperature of the memristor 9 is one parameter that affects the expected value.

When the memristor 9 is a magnetic domain wall moving element 9A, processing precision of the first ferromagnetic layer 11 differs depending on the position on the semiconductor wafer at which the magnetic domain wall moving element 9A is formed or a position relative to another magnetic domain wall moving element 9A. The shape of the first ferromagnetic layer 11 affects the probability that the magnetic domain wall DW will be trapped. Accordingly, the position information of the memristor 9 to be updated is one parameter that affects the expected value.

An example in which the memristor 9 is a magnetic domain wall moving element 9A has been specifically described above. However, when the memristor 9 is another element, a desired conductance change may not occur even if a predetermined writing signal is applied due to precision limitation or variability in manufacturing in spite of differences in physical, electrical, and chemical phenomena. The probability of the phenomenon where such a conductance change does not occur may change over time depending on the type of the memristor 9. In such a memristor 9, the same advantageous effects are obtained by adaptively changing the probability model.

Subsequently, in the writing signal determining step S41, the writing signal is determined based on the selected expected value and the necessary value of the conductance change amount of the memristor 9.

For example, when the expected value is equal to or less than a predetermined threshold value, the writing pulse is intensified. Intensifying of the writing pulse include, for example, increasing the intensity of the wiring pulse, increasing the pulse width of the writing pulse, increasing the number of applied times of the writing pulse, or decreasing the pulse interval. The threshold value can be arbitrarily set. For example, the relationship between the expected value and the necessary value may be presented as a function.

In the writing step S42, the processor 5 instructs the writing signal generator 6 to output the writing signal determined in the writing signal determining step S41 to a predetermined memristor 9. The writing signal generator 6 applies the writing signal to the predetermined memristor 9.

A method of controlling the neuromorphic device 1 will be described below with reference to the flowchart for online learning illustrated in FIG. 10. The method of controlling the neuromorphic device 1 includes a preliminary evaluation step S1, a weight updating step S2, a conductance converting step S3, and a signal determining step S4.

The online learning is different from the batch learning in that learning is performed sequentially. Accordingly, in the online learning, the weights of the neural network are gradually updated such that the weights are optimized by every data input step.

The steps except for the procedures mentioned above are same as the batch learning in principle and can be performed in the same way.

While embodiments of the present invention have been described above in detail in conjunction with the drawings, the configurations of the embodiments, combinations thereof, and the like are only examples, and the embodiments can be subjected to addition, omission, and substitution of any configuration and other modification without departing from the gist of the present invention.

EXPLANATION OF REFERENCES

1 Neuromorphic device
2 Control unit
3 Memristor array
4 Memory
5 Processor
6 Writing signal generator
7 Comparator
8 Temperature sensor
9 Memristor
9A Magnetic domain wall moving element 11 First ferromagnetic layer
12 Second ferromagnetic layer
13 Nonmagnetic layer
14 First magnetization fixed layer
15 Second magnetization fixed layer
16 Insulating layer
DW Magnetic domain wall
S1 Preliminary evaluation step
S2 Update step
S21 Input step
S22 Inference step
S23 Error measuring step
S24 Update value calculating step
S25 Determination step
S3 Conductance converting step
S31 Discretization step size setting step
S32 Necessary value determining step
S4 Signal determining step
S41 Writing signal determining step
S42 Writing step

What is claimed is:

1. A neuromorphic device comprising a control unit, wherein the control unit is configured to be connectable to a memristor having electrical characteristics in which conductance change occurs stochastically when a writing signal is applied to the memristor,
wherein the writing signal is determined based on a necessary value of the conductance change amount of the memristor which is calculated from an update value of a weight of a neural network and an expected value by which the conductance of the memristor changes when a reference writing signal is applied to the memristor, and
wherein the magnetic domain wall moving element includes a first ferromagnetic layer including a magnetic domain wall, a second ferromagnetic layer, and a nonmagnetic layer interposed between the first ferromagnetic layer and the second ferromagnetic layer.

2. The neuromorphic device according to claim 1, wherein the expected value is calculated as a product of a probability with which the conductance of the memristor changes when the reference writing signal is applied to the memristor and an ideal value when the conductance of the memristor changes ideally when the reference writing signal is applied to the memristor.

3. The neuromorphic device according to claim 1, wherein the control unit is configured to set the expected value based on the conductance of the memristor.

4. The neuromorphic device according to claim 1, wherein the control unit is configured to set the expected value based on an application voltage of the reference writing signal.

5. The neuromorphic device according to claim 1, wherein the control unit includes a temperature sensor, and wherein the control unit is configured to set the expected value based on a temperature measured by the temperature sensor.

6. The neuromorphic device according to claim 1, further comprising a memristor array connected to the control unit, wherein the memristor array includes a plurality of memristors, and wherein at least one of the plurality of memristors is the memristor.

7. A neuromorphic device comprising a control unit, wherein the control unit is configured to be connectable to a memristor having electrical characteristics in which conductance change occurs stochastically when a writing signal is applied to the memristor, wherein the writing signal is determined based on a necessary value of the conductance change amount of the memristor which is calculated from an update value of a weight of a neural network and an expected value by which the conductance of the memristor changes when a reference writing signal is applied to the memristor, wherein the memristor array includes a plurality of the memristors, and wherein the control unit is configured to set the expected value based on a position of the memristor in the memristor array.

8. A neuromorphic device comprising a control unit, a semiconductor wafer; and a memristor array connected to the control unit and formed on the semiconductor wafer, wherein the control unit is configured to be connectable to a memristor having electrical characteristics in which conductance change occurs stochastically when a writing signal is applied to the memristor, wherein the writing signal is determined based on a necessary value of the conductance change amount of the memristor which is calculated from an update value of a weight of a neural network and an expected value by which the conductance of the memristor changes when a reference writing signal is applied to the memristor, wherein the memristor array includes a plurality of the memristors, and wherein the control unit is configured to set the expected value based on a position of the memristor on the semiconductor wafer.

9. A neuromorphic device comprising a control unit, and a memristor array connected to the control unit, wherein the control unit is configured to be connectable to a memristor having electrical characteristics in which conductance change occurs stochastically when a writing signal is applied to the memristor, wherein the writing signal is determined based on a necessary value of the conductance change amount of the memristor which is calculated from an update value of a weight of a neural network and an expected value by which the conductance of the memristor changes when a reference writing signal is applied to the memristor, wherein the memristor array includes a plurality of the memristors, and wherein the control unit is configured to set the expected value based on behavior of the conductance change when the reference writing signal is applied to at least one memristor in the memristor array.

10. The neuromorphic device according to claim 9, wherein the memristor in which the behavior of the conductance change when the reference writing signal is applied thereto is evaluated is a reference element for evaluation.

* * * * *